United States Patent
Sato et al.

(10) Patent No.: US 10,844,918 B2
(45) Date of Patent: Nov. 24, 2020

(54) BRAKE SHOE ABRASION DETECTION UNIT OF RAILWAY VEHICLE, AND BRAKE SHOE ABRASION DETECTION UNIT SET

(71) Applicant: KAWASAKI JUKOGYO KABUSHIKI KAISHA, Kobe (JP)

(72) Inventors: Yoshi Sato, Sanda (JP); Takehiro Nishimura, Kobe (JP); Akihiko Tada, Kobe (JP); Takao Sekiya, Kobe (JP); Takashi Miyazaki, Kobe (JP); Kazutsuna Ikeda, Kobe (JP); Masayuki Mitsue, Kobe (JP); Yuta Yoshimatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 17 days.

(21) Appl. No.: 16/116,262

(22) Filed: Aug. 29, 2018

(65) Prior Publication Data
US 2019/0063532 A1    Feb. 28, 2019

(30) Foreign Application Priority Data

Aug. 29, 2017    (JP) ................. 2017-164466

(51) Int. Cl.
*F16D 66/02*    (2006.01)
*B61H 1/00*    (2006.01)
*F16D 65/09*    (2006.01)
*B60T 17/22*    (2006.01)
*F16D 49/00*    (2006.01)

(52) U.S. Cl.
CPC .......... *F16D 66/026* (2013.01); *B60T 17/228* (2013.01); *B61H 1/00* (2013.01); *F16D 49/00* (2013.01); *F16D 65/09* (2013.01); *F16D 66/02* (2013.01); *F16D 66/028* (2013.01); *B60Y 2410/111* (2013.01)

(58) Field of Classification Search
CPC ....... F16D 66/026; F16D 66/028; B61H 1/00; B60Y 2410/111
See application file for complete search history.

(56) References Cited

U.S. PATENT DOCUMENTS

| | | | | |
|---|---|---|---|---|
| 5,909,171 A * | 6/1999 | Kyrtsos | ................... | F16D 66/00 116/208 |
| 6,360,850 B1 * | 3/2002 | Odisho | ................ | F16D 66/024 188/1.11 L |
| 9,644,696 B2 * | 5/2017 | Eden | ..................... | F16D 66/027 |
| 2008/0190712 A1 * | 8/2008 | Hagberg | ............... | F16D 65/092 188/1.11 L |

(Continued)

FOREIGN PATENT DOCUMENTS

| | | | |
|---|---|---|---|
| DE | 102008020425 | * | 1/2009 |
| DE | 102014112868 | * | 3/2016 |

(Continued)

*Primary Examiner* — Vishal R Sahni
(74) *Attorney, Agent, or Firm* — Oliff PLC

(57) ABSTRACT

There is provided a configuration that can precisely detect abrasion of brake shoes of a railway vehicle. A brake shoe abrasion detection unit includes: at least one abrasion detection RF tag that is attached at a position of an abrasion limit of a brake shoe of a railway vehicle tread brake or a position closer to a braking surface than the abrasion limit; and a reference RF tag that is attached at a position beyond the abrasion limit of the brake shoe.

11 Claims, 10 Drawing Sheets

(56) References Cited

U.S. PATENT DOCUMENTS

| | | | |
|---|---|---|---|
| 2010/0030490 A1* | 2/2010 | Wright | F16D 66/02 |
| | | | 702/34 |
| 2010/0253497 A1 | 10/2010 | Bakker et al. | |
| 2011/0012724 A1* | 1/2011 | Elstorpff | F16D 66/02 |
| | | | 340/454 |
| 2011/0133923 A1* | 6/2011 | Evans | B60T 17/221 |
| | | | 340/454 |
| 2011/0285507 A1* | 11/2011 | Nelson | G06K 19/0739 |
| | | | 340/10.1 |
| 2014/0091918 A1* | 4/2014 | Pfeffer | F16D 66/026 |
| | | | 340/454 |
| 2015/0152931 A1* | 6/2015 | Moore | F16D 66/027 |
| | | | 188/1.11 L |
| 2017/0184169 A1 | 6/2017 | Dohle et al. | |
| 2018/0060718 A1* | 3/2018 | Akamatsu | G06K 19/077 |
| 2019/0040935 A1* | 2/2019 | Hermey | F16L 3/015 |

FOREIGN PATENT DOCUMENTS

| | | |
|---|---|---|
| JP | 2002-250383 A | 9/2002 |
| JP | 2011-501051 A | 1/2011 |
| JP | 2017-512945 A | 5/2017 |

* cited by examiner

FIG. 9

| (Axle position) | | | First axle | Second axle | Third axle | Fourth axle |
|---|---|---|---|---|---|---|
| Vehicle ID | | | 5001 | 5001 | 5001 | 5001 |
| Brake shoe RF tag ID | 2A | 31 | 1 | 13 | 25 | - |
| | | 32 | 2 | 14 | 26 | - |
| | | 33 | 3 | 15 | 27 | - |
| | 2B | 31 | 4 | 16 | 28 | 40 |
| | | 32 | 5 | 17 | 29 | 41 |
| | | 33 | 6 | 18 | 30 | 42 |
| | 2C | 31 | 7 | 19 | 31 | 43 |
| | | 32 | 8 | 20 | 32 | 44 |
| | | 33 | 9 | 21 | 33 | 45 |
| | 2D | 31 | 10 | 22 | 34 | 46 |
| | | 32 | 11 | 23 | 35 | 47 |
| | | 33 | 12 | 24 | 36 | 48 |
| Reading time | | | A | A+1 | A+2 | A+3 |

$X_1$

| (Axle position) | | | First axle | Second axle | Third axle | Fourth axle |
|---|---|---|---|---|---|---|
| Vehicle ID | | | 5002 | 5002 | 5002 | 5002 |
| Brake shoe RF tag ID | 2A | 31 | 49 | - | 73 | - |
| | | 32 | 50 | 62 | 74 | - |
| | | 33 | 51 | 63 | 75 | 87 |
| | 2B | 31 | 52 | - | 76 | - |
| | | 32 | 53 | 65 | 77 | - |
| | | 33 | 54 | 66 | 78 | 90 |
| | 2C | 31 | 55 | 67 | - | - |
| | | 32 | 56 | 68 | 80 | - |
| | | 33 | 57 | 69 | 81 | 93 |
| | 2D | 31 | 58 | 70 | 82 | - |
| | | 32 | 59 | 71 | 83 | - |
| | | 33 | 60 | 72 | 84 | 96 |
| Reading time | | | B | B+2 | B+4 | B+6 |

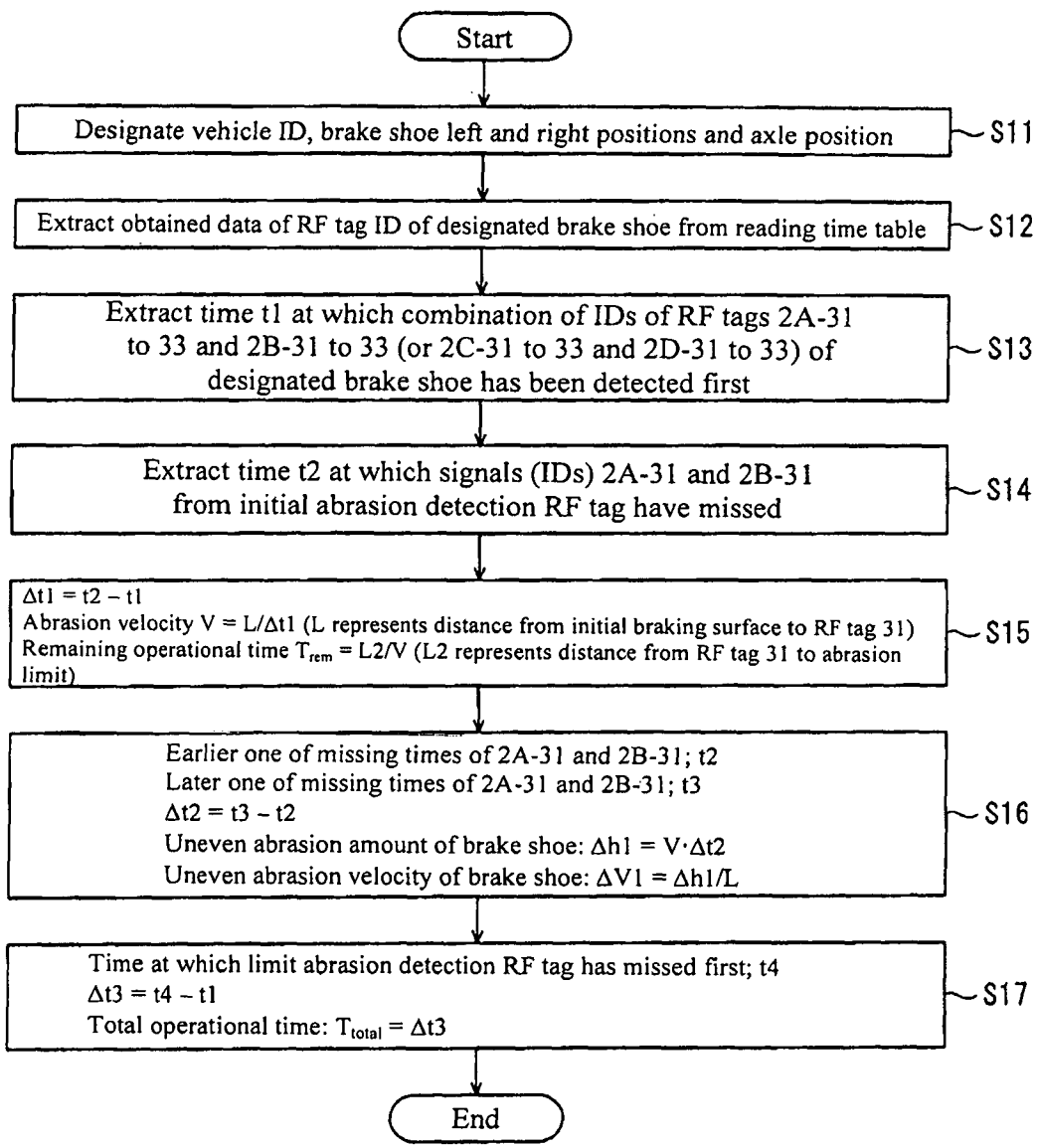

```
                    ( Start )
                         ↓
  Designate vehicle ID, brake shoe left and right positions and axle position   — S11
                         ↓
  Extract obtained data of RF tag ID of designated brake shoe from reading time table   — S12
                         ↓
  Extract time t1 at which combination of IDs of RF tags 2A-31
  to 33 and 2B-31 to 33 (or 2C-31 to 33 and 2D-31 to 33) of     — S13
  designated brake shoe has been detected first
                         ↓
  Extract time t2 at which signals (IDs) 2A-31 and 2B-31
  from initial abrasion detection RF tag have missed           — S14
                         ↓
```

$\Delta t1 = t2 - t1$
Abrasion velocity $V = L/\Delta t1$ (L represents distance from initial braking surface to RF tag 31) — S15
Remaining operational time $T_{rem} = L2/V$ (L2 represents distance from RF tag 31 to abrasion limit)

Earlier one of missing times of 2A-31 and 2B-31; t2
Later one of missing times of 2A-31 and 2B-31; t3
$\Delta t2 = t3 - t2$   — S16
Uneven abrasion amount of brake shoe: $\Delta h1 = V \cdot \Delta t2$
Uneven abrasion velocity of brake shoe: $\Delta V1 = \Delta h1/L$ Time at which limit abrasion detection RF tag has missed first; t4
$\Delta t3 = t4 - t1$   — S17
Total operational time: $T_{total} = \Delta t3$ ( End )

BRAKE SHOE ABRASION DETECTION UNIT OF RAILWAY VEHICLE, AND BRAKE SHOE ABRASION DETECTION UNIT SET

BACKGROUND OF THE INVENTION

(1) Field of the Invention

The present invention relates to a brake shoe abrasion detection unit that is attached to a brake shoe of a railway vehicle and detects abrasion of the brake shoe, and a brake shoe abrasion detection unit set.

(2) Description of Related Art

Conventionally, there has been proposed an abrasion detection device in which transponders are attached at abrasion limit positions of brake shoes of a railway vehicle (see, for example, Japanese Patent Application Laid-Open No. 2002-250383). According to the abrasion detection device, transponders are destroyed when the brake shoes are abraded to an abrasion limit. Consequently, when a transceiver cannot receive an identification signal from the transponder, it is possible to determine that the abrasion of the brake shoe reaches the abrasion limit.

SUMMARY OF THE INVENTION

However, the brake shoes perform braking by using abrasion against wheels, and therefore, every time the brake shoes perform braking, a temperature rises, and a heat load is applied to the transponders over and over again. That is, even when the transceiver cannot receive an identification number from the transponder, there is a probability that only the transponder is heat-injured, and the brake shoe is not abraded to the abrasion limit. Furthermore, collision against a pebble is likely to destroy the transponder, and the transponder is likely to drop from the brake shoe. Thus, there is a problem that various disturbances are likely to occur during abrasion detection of the brake shoe, and therefore abrasion detection precision is insufficient.

It is therefore an object of the present invention to provide a configuration which can precisely detect abrasion of brake shoes of a railway vehicle.

A brake shoe abrasion detection unit of a railway vehicle according to one aspect of the present invention is a brake shoe abrasion detection unit that is attached to a brake shoe of a railway vehicle tread brake and detects abrasion of the brake shoe. The brake shoe abrasion detection unit includes: at least one abrasion detection RF tag that is attached at a position of an abrasion limit of the brake shoe or a position closer to a braking surface than the abrasion limit; and a reference RF tag that is attached at a position beyond the abrasion limit of the brake shoe.

According to this configuration, when a reader normally reads a signal from the reference RF tag and misses reading data of a signal from the abrasion detection RF tag, it is possible to determine that predetermined abrasion occurs in the brake shoe to which the abrasion detection RF tag is attached. When the reader misses reading signals from both of the reference RF tag and the abrasion detection RF tag, it is possible to determine that an error has occurred in the abrasion detection RF tag. Consequently, it is possible to determine whether a missing factor of the signal read by the reader from the abrasion detection RF tag is due to a progress of the abrasion of the brake shoe or the error of the abrasion detection RF tag, and precisely detect the abrasion of the brake shoe of the railway vehicle.

The present invention can provide a configuration which can precisely detect abrasion of brake shoes of a railway vehicle.

BRIEF DESCRIPTION OF THE DRAWINGS

FIG. 9 is a diagram showing an example of a reading time table shown in FIG. 8;

FIG. 10 is an abrasion characteristics analyzing flowchart of a server shown in FIG. 1;

DETAILED DESCRIPTION OF PREFERRED EMBODIMENTS

Hereinafter, embodiments of the present invention will be described with reference to the drawings. In addition, a direction in which a railway vehicle travels and a vehicle body extends is a vehicle longitudinal direction (forward and backward directions), and a horizontal direction perpendicular to the vehicle longitudinal direction is a vehicle width direction (left and right directions).

Figure 1:
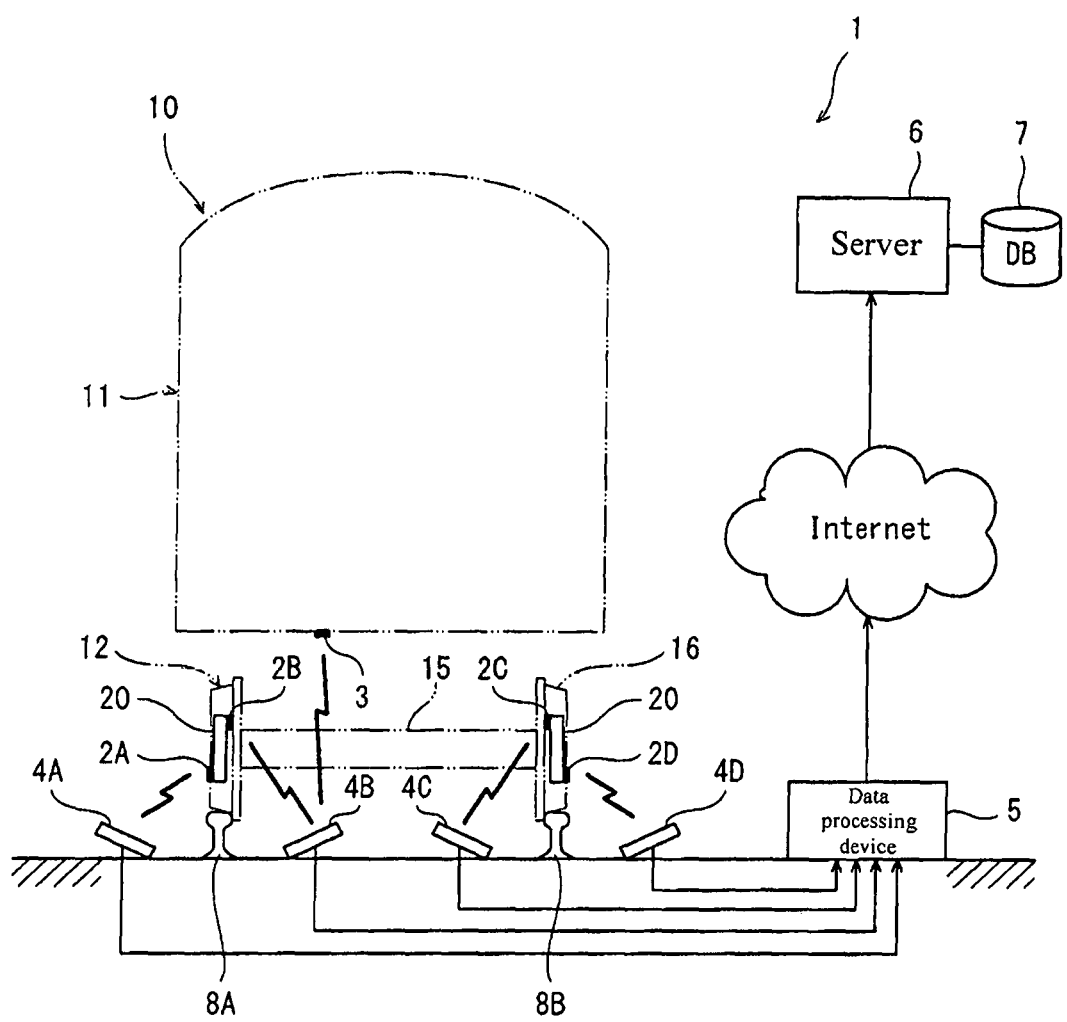
FIG. 1 is a schematic view of a brake shoe abrasion detection system of a railway vehicle according to an embodiment.

FIG. 1 is a schematic view of a brake shoe abrasion detection system 1 of a railway vehicle according to an embodiment. As shown in FIG. 1, a railway vehicle 10 is a set vehicle formed by coupling a plurality of vehicles, and each vehicle includes a vehicle body 11 and a railway bogie 12. The railway bogie 12 includes a tread brake device which actuates a brake by abrasion caused by pressing brake shoes 20 against treads of wheels 16. The brake shoe abrasion detection system 1 is a system which automatically detects the abrasion of the brake shoes 20 of the railway vehicle 10 by using a radio frequency identifier (RFID), and reduces a maintenance load of the brake shoes. The brake shoe abrasion detection system 1 includes multiple brake shoe abrasion detection units 2A to 2D, a vehicle body RF tag 3, four readers 4A to 4D, a data processing device 5, a server 6 and a database 7.

The brake shoe abrasion detection units 2A to 2D include a plurality of RF tags and are attached to the brake shoes 20 of the railway vehicle 10, and a detailed configuration will be described below. The vehicle body RF tag 3 is attached to the vehicle body 11 of the railway vehicle 10, and is applied to a floor lower surface, for example. The readers 4A to 4D read a signal including identification information of each RF tag of the brake shoe abrasion detection units 2A to 2D without contacting each RF tag. The readers 4A to 4D are installed near rails 8A and 8B, and are disposed at an entrance of a train shed, for example. In addition, the readers 4A to 4D may be installed not only at the entrance of the train shed but also on a commercial line, and an installation place is not particularly limited. One (e.g., reader 4B) of the readers 4A to 4D also reads a signal including the identification information of the vehicle body RF tag 3 without contacting the vehicle body RF tag 3. In addition, a dedicated reader which reads the signal including the identification information of the vehicle body RF tag 3 may be provided in addition to the readers 4A to 4D.

More specifically, the reader 4A is installed outside the rail 8A in the vehicle width direction. The reader 4B is installed closer to the rail 8A between a pair of rails 8A and 8B. The reader 4C is installed closer to the rail 8B between the pair of rails 8A and 8B. The reader 4D is installed outside the rail 8B in the vehicle width direction. In addition, instead of the readers 4B and 4C, one reader may be installed at a center between the rails 8A and 8B. The readers 4A to 4D are installed inclining with respect to a horizontal plane such that normal lines of communication surfaces of the readers 4A to 4D face the corresponding brake shoe abrasion detection units 2A to 2D.

The data processing device 5 processes the signals read by of the readers 4A to 4D, and transmits the signals to the server 6 via a network (e.g., Internet). That is, according to the present embodiment, a computer is dispersed to the data processing device 5 and the server 6 via the network. In addition, the network is not limited to the Internet, and may be various other communication networks such as a LAN, a WAN, a satellite communication line and a mobile telephone network. The server 6 analyzes signal data received from the data processing device 5, creates a maintenance plan of the brake shoes 20 based on this analyzed data, and transmits the analyzed data to a maintenance management center (not shown). The analyzed data of the server 6 is accumulated and stored as past information in the database 7.

The data processing device 5 determines vehicle specifying information corresponding to the signals read by the readers 4A to 4D from the brake shoe abrasion detection units 2A to 2D based on the signal data read by the reader 4B from the vehicle body RF tag 3. In this regard, the vehicle specifying information is information such as a vehicle number, a set number or a railway bogie which can be associated with the brake shoes. An installation test RF tag (not shown) is set to communication areas of the readers 4A to 4D. When a signal cannot be correctly received from the test RF tag, the data processing device 5 determines that abnormalities have occurred in the readers 4A to 4D.

Figure 2:
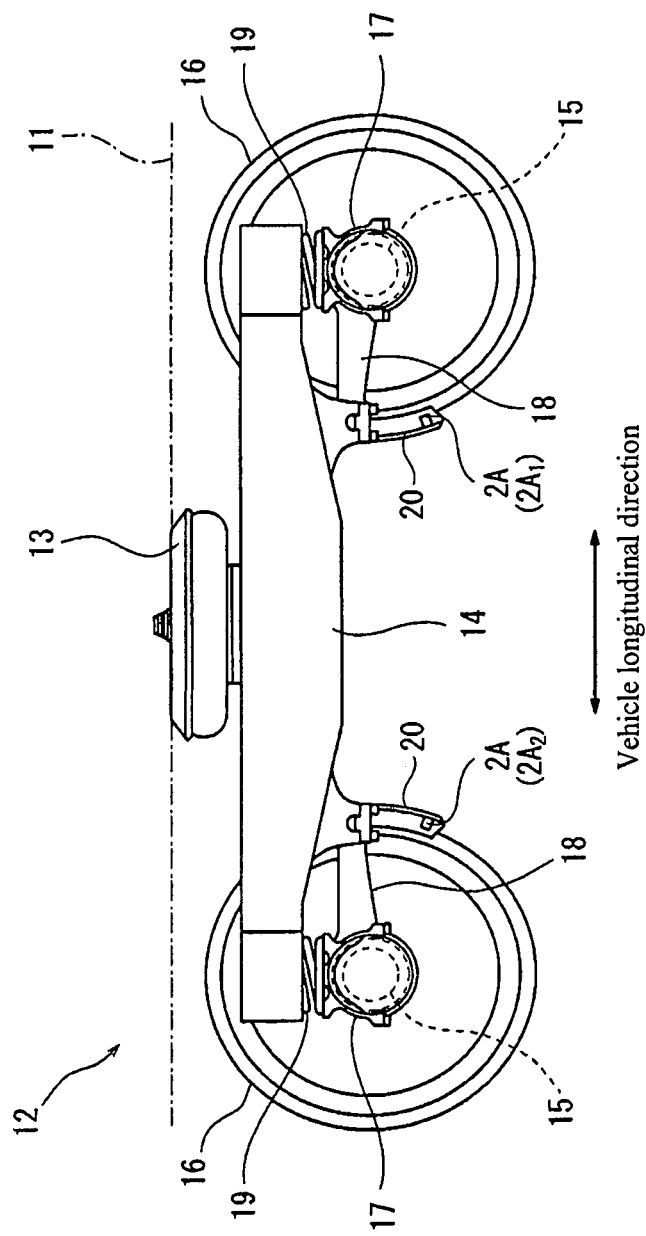
FIG. 2 is a side view showing a railway bogie of the railway vehicle shown in FIG. 1 seen from a vehicle width direction.

FIG. 2 is a side view showing the railway bogie 12 of the railway vehicle 10 shown in FIG. 1 seen from the vehicle width direction. As shown in FIG. 2, the railway bogie 12 includes a railway bogie frame 14 which supports the vehicle body 11 via a secondary suspension 13 (e.g., air suspension). Vehicle axles 15 extending along the vehicle width direction are disposed on both sides of the railway bogie frame 14 in a vehicle longitudinal direction. The wheels 16 are fixed to portions on both sides of the vehicle axle 15 in the vehicle width direction, respectively. Axle boxes 17 house both end portions of the vehicle axles 15 in the vehicle width direction via bearings (not shown). The axle boxes 17 are coupled to the railway bogie frame 14 via an axle arm 18. A primary suspension 19 (e.g., coil spring) is interposed between the railway bogie frame 14 and the axle box 17. The brake shoe 20 is disposed at a position facing the tread of the wheel 16. The brake shoe 20 is driven by an actuator (not shown) to come into contact with and move away from the tread of the wheel 16.

Figure 3:
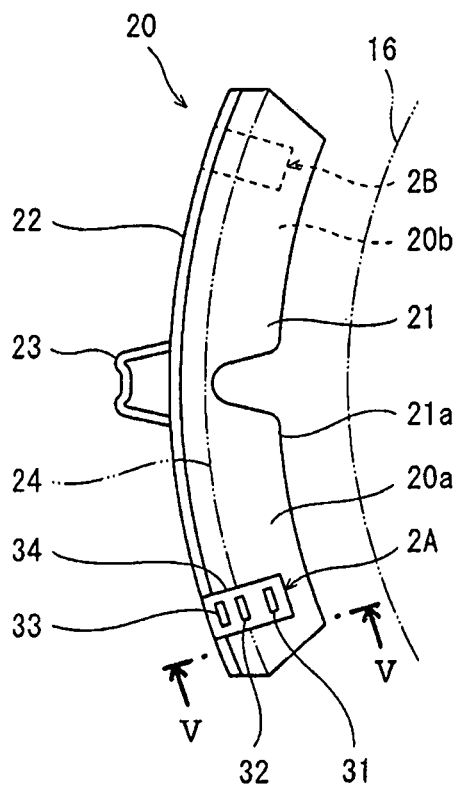
FIG. 3 is a side view showing brake shoes to which the brake shoe abrasion detection units are attached in the railway bogie shown in FIG. 2 seen from the vehicle width direction.
Figure 4:
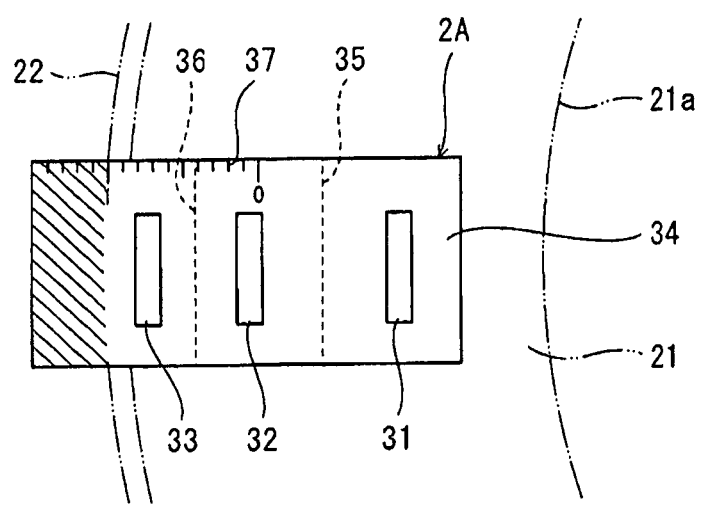
FIG. 4 is a plan view showing the brake shoe abrasion detection unit shown in FIG. 3 seen from the vehicle width direction.
Figure 5:
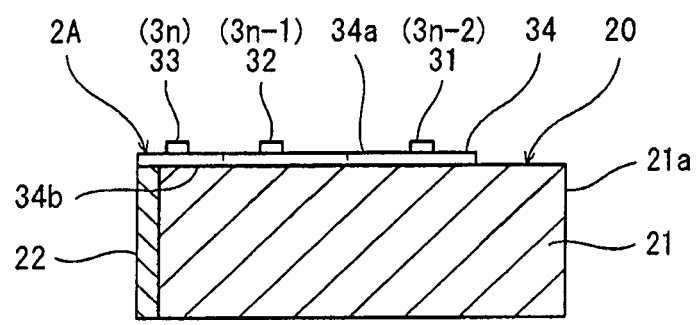
FIG. 5 is a sectional view taken along V-V line in FIG. 3.

FIG. 3 is a side view showing the brake shoes 20 to which the brake shoe abrasion detection units 2A to 2D are attached in the railway bogie 12 shown in FIG. 2 seen from the vehicle width direction. FIG. 4 is a plan view showing the brake shoe abrasion detection unit 2A shown in FIG. 3 seen from the vehicle width direction. FIG. 5 is a sectional view along V-V line in FIG. 3. As shown in FIGS. 3 to 5, the brake shoe 20 includes a brake shoe main body 21 which is formed by an abrasion material made of a metal or a resin, a base metal 22 which is fixed to a back surface of the brake shoe main body 21, and a mounting plate 23 which is provided on the back surface, of the base metal 22. A braking surface 21a of the brake shoe main body 21 has an arc shape along the tread of the wheel 16 seen from the vehicle width direction.

The brake shoe abrasion detection unit 2A (first brake shoe abrasion detection unit) is attached to a lower portion of an outer surface 20a facing the outside of the brake shoe 20 in the vehicle width direction. The brake shoe abrasion detection unit 2B (second brake shoe abrasion detection unit) is attached to an upper portion of an inner surface 20b facing the inside of the brake shoe 20 in the vehicle width direction. That is, an upper portion of the outer surface 20a of the brake shoe 20 is covered by a railway bogie part (axle arm 18) other than the brake shoe 20 seen from the outside of the railway bogie 12 in the vehicle width direction (see FIG. 1). The brake shoe abrasion detection unit 2A is attached to a lower portion of the outer surface 20a of the brake shoe 20 exposed toward the outside in the vehicle width direction. A configuration of each of the brake shoe abrasion detection units 2A to 2D attached to each brake shoe 20 is basically the same, and therefore the brake shoe abrasion detection unit 2A will be described as a representative.

The brake shoe abrasion detection unit 2A includes an initial abrasion detection RF tag 31 (first abrasion detection RF tag), a limit abrasion detection RF tag 32 (second abrasion detection RF tag), a reference RF tag 33, and a base sheet 34. Each of the RF tags 31 to 33 includes, for example, a base material, an antenna and an IC chip, and the antenna may be located apart from the RF tag. Each of the RF tags 31 to 33 is disposed such that a longitudinal direction of the RF tags 31 to 33 is perpendicular to a thickness direction of the brake shoe 20. The initial abrasion detection RF tag 31 is attached at a position closer to the braking surface 21a than an abrasion limit 24 of the brake shoe 20. When the initial abrasion detection RF tag 31 is destroyed, it is possible to detect a progress of abrasion of the brake shoe.

The limit abrasion detection RF tag 32 is attached at a position of the abrasion limit 24 of the brake shoe 20. When the limit abrasion detection RF tag 32 is destroyed similar to the initial abrasion detection RF tag 31, it is possible to detect a progress of abrasion of the brake shoe. The reference RF tag 33 is attached at a position beyond the abrasion limit 24 of the brake shoe 20, i.e., at a position apart toward the back surface side (a side opposite to the braking surface 21a) from the abrasion limit 24. Unlike the RF tags 31 and 32, the reference RF tag 33 does not detect a progress of abrasion of the brake shoe when the reference RF tag 33 is destroyed, and indicates that the brake shoe abrasion detection system 1 is normally operating when the reference RF tag 33 is not destroyed.

According to this configuration, when the reader 4A normally reads the signals from the limit abrasion detection RF tag 32 and the reference RF tag 33, and the reader 4A misses reading signal data from the initial abrasion detection RF tag 31, the data processing device 5 can determine that abrasions progresses to a portion of the brake shoe 20 to which the initial abrasion detection RF tag 31 has been attached. In this regard, the miss includes not only damage of the IC chip but also signal interruption due to damage of the antenna. Furthermore, when the reader 4A normally reads a signal from the reference RF tag 33 and the reader 4A misses reading each signal from the first and second abrasion detection RF tags 31 and 32, the data processing device 5 can determine that abrasion reaching the abrasion limit 24 of the brake shoe 20 has occurred.

On the other hand, when the reader 4A misses reading not only the signals from the first and/or second abrasion detection RF tags 31 and 32 but also the signal from the reference RF tag 33, the data processing device 5 can determine that an error has occurred in the first and second abrasion detection RF tags 31 and 32. Consequently, it is possible to determine whether a missing factor of the signals read by the reader 4A from the abrasion detection RF tags 31 and 32 is due to the progress of the abrasion of the brake shoe 20 or errors of the abrasion detection RF tags 31 and 32, and precisely detect the abrasion of the brake shoe 20.

Furthermore, the initial abrasion detection RF tag 31 is attached at a position closer to the braking surface 21a than the abrasion limit 24 of the brake shoe 20, and the limit abrasion detection RF tag 32 is attached at the position of the abrasion limit 24, so that it is possible to learn the degree of the progress of abrasion of the brake shoe 20 stepwise. Consequently, the server 6 can learn tendency of the abrasion progress of the brake shoe 20, and make a maintenance plan of the brake shoe 20 in advance and in a timely manner.

The initial abrasion detection RF tag 31, the limit abrasion detection RF tag 32 and the reference RF tag 33 are disposed in a row at predetermined intervals in a radial direction (the radial direction of the wheel 16) on the base sheet 34, and, for example, the base sheet is formed in one seal shape. Each of the RF tags 31 to 33 is provided on a top surface 34a of the base sheet 34. That is, a back surface of each of the RF tags 31 to 33 is fixed to the top surface 34a of the base sheet 34, and a top surface (a surface opposite to a back surface) of each of the RF tags 31 to 33 is a communication surface. An adhesive layer to be applied to the brake shoe 20 is formed on a back surface 34b of the base sheet 34. During maintenance before the brake shoe abrasion detection unit 2A is applied to the brake shoe 20, the adhesive layer of the back surface 34b of the base sheet 34 is protected by a release paper (not shown).

According to this configuration, the initial abrasion detection RF tag 31, the limit abrasion detection RF tag 32 and the reference RF tag 33 can be handled easily. Furthermore, the intervals between the RF tags 31 and 33 on the base sheet 34 match with an attachment interval on the brake shoe 20, and the base sheet 34 is attached to the brake shoe 20, so that the base sheet 34 and each of the RF tags 31 to 33 can be attached to the brake shoe by one touch and attachment operability improves. Furthermore, the base sheet 34 is interposed between each of the RF tags 31 to 33 and the brake shoe 20, so that heat from the brake shoe 20 does not directly transmit to each of the RF tags 31 to 33 and it is possible to reduce a heat load on each of the RF tags 31 to 33. Furthermore, the area of the base sheet 34 in a plan view is larger than a total area of each of the RF tags 31 to 33, so that the base sheet 34 enhances heat dissipation and reduces the heat load on each of the RF tags 31 to 33.

A heat resistant sheet for which a heat resistant material is used is preferably used for the base sheet 34. For example, a fluorine resin or a polyimide resin can be used for this heat resistant material. With this configuration, the base sheet 34 suppresses heat transmission from the brake shoe 20 to each of the RF tags 31 to 33, so that it is possible to prevent heat injury of the RF tags without using costly heat resistant RF tags.

The base sheet 34 includes a first breakable portion 35 (a first fracture scheduled portion) formed between the initial abrasion detection RF tag 31 and the limit abrasion detection RF tag 32, and a second breakable portion 36 (a second fracture scheduled portion) formed between the limit abrasion detection RF tag 32 and the reference RF tag 33. The first and second breakable portions 35 and 36 are formed to be easily fractured compared to other portions of the base sheet 34. For example, the first and second breakable portions 35 and 36 employ a configuration where a plurality of holes is formed similar to perforations in one row on the base sheet 34 at intervals from each other. Furthermore, the first and second breakable portions 35 and 36 may be formed thinner than the other portions of the base sheet 34.

According to this configuration, when abrasion of the brake shoe 20 destroys the initial abrasion detection RF tag 31, a load during this destruction fractures the base sheet 34 from the first breakable portion 35. Consequently, it is possible to prevent the load from transmitting to the limit abrasion detection RF tag 32 and the reference RF tag 33. Furthermore, similarly, when abrasion of the brake shoe 20 destroys the limit abrasion detection RF tag 32, too, a load during this destruction fractures the base sheet 34 from the second breakable portion 36. Consequently, it is possible to prevent the load from transmitting to the reference RF tag 33.

In addition, there may be employed a configuration where perforations are further formed adjacent to the first and second breakable portions 35 and 36, and the base sheet 34 between the initial abrasion detection RF tag 31 and the limit abrasion detection RF tag 32 and the base sheet 34 between the limit abrasion detection RF tag 32 and the reference RF tag 33 are removed. Consequently, it is possible to prevent the load during destruction from transmitting to the limit abrasion detection RF tag 32 and the reference RF tag 33.

Scale marks 37 aligned in a thickness direction of the brake shoe 20 (the radial direction of the wheel) are marked on the base sheet 34. According to the present embodiment, on the base sheet 34, a zero point of the scale division 37 is marked at a position meeting the limit abrasion detection RF tag 32 disposed at the position, of the abrasion limit 24 of the brake shoe 20, and the scale marks 37 are marked to a position beyond the reference RF tag 33 in ascending order from the zero point to the reference RF tag 33. When, for example, the position of the abrasion limit 24 is defined by a distance from an end rim on the back surface side of the brake shoe 20, if the base sheet 34 is applied to the brake shoe 20 in a state where the position on the scale division 37 indicating the same value as the distance matches with the end rim on the back surface side of the brake shoe 20, the limit abrasion detection RF tag 32 matches with the position of the abrasion limit 24. In addition, when there is a portion (a diagonal line portion in FIG. 4) which projects from the brake shoe 20, the projection portion may be removed by scissors.

According to this configuration, each of the RF tags 31 to 33 can be attached at a predetermined position on the brake shoe 20 by seeing the scale marks 37 of the base sheet 34. Consequently, it is not necessary to use a ruler in addition to the brake shoe abrasion detection unit 2A, and attachment operability and attachment precision improve. Furthermore, the zero point of the scale division 37 is marked at the position meeting the abrasion limit 24 of the brake shoe 20. Consequently, it is possible to commonly use the brake shoe abrasion detection unit 2A for the brake shoe whose position of the abrasion limit 24 is different, too, and reduce a type of the brake shoe abrasion detection unit 2A. In addition, when the brake shoe abrasion detection unit 2A is prepared per brake shoe type, the scale marks 37 may not be formed.

An identification number of the reference RF tag 33 is determined according to a first rule. An identification number of the limit abrasion detection RF tag 32 is determined according to a second rule different from the first rule. An identification number of the initial abrasion detection RF tag 31 is determined according to a third rule different from the first and second rules. For example, the identification number of the reference RF tag 33 is "3n" (n is a natural number). The identification number of the limit abrasion detection RF tag 32 is "3n−1". The identification number of the initial abrasion detection RF tag 31 is "3n−2".

Thus, by seeing which one of the first to third rules the identification number read by the reader 4A belongs, it is possible to easily determine whether the identification number belongs to the initial abrasion detection RF tag 31, the limit abrasion detection RF tag 32 or the reference RF tag 33. Consequently, it is not necessary to register each identification number of the first and second abrasion detection RF tags 31 and 32 and the reference RF tag 33 in advance in the database 7, and it is possible to simplify a system implementation operation.

Figure 6:
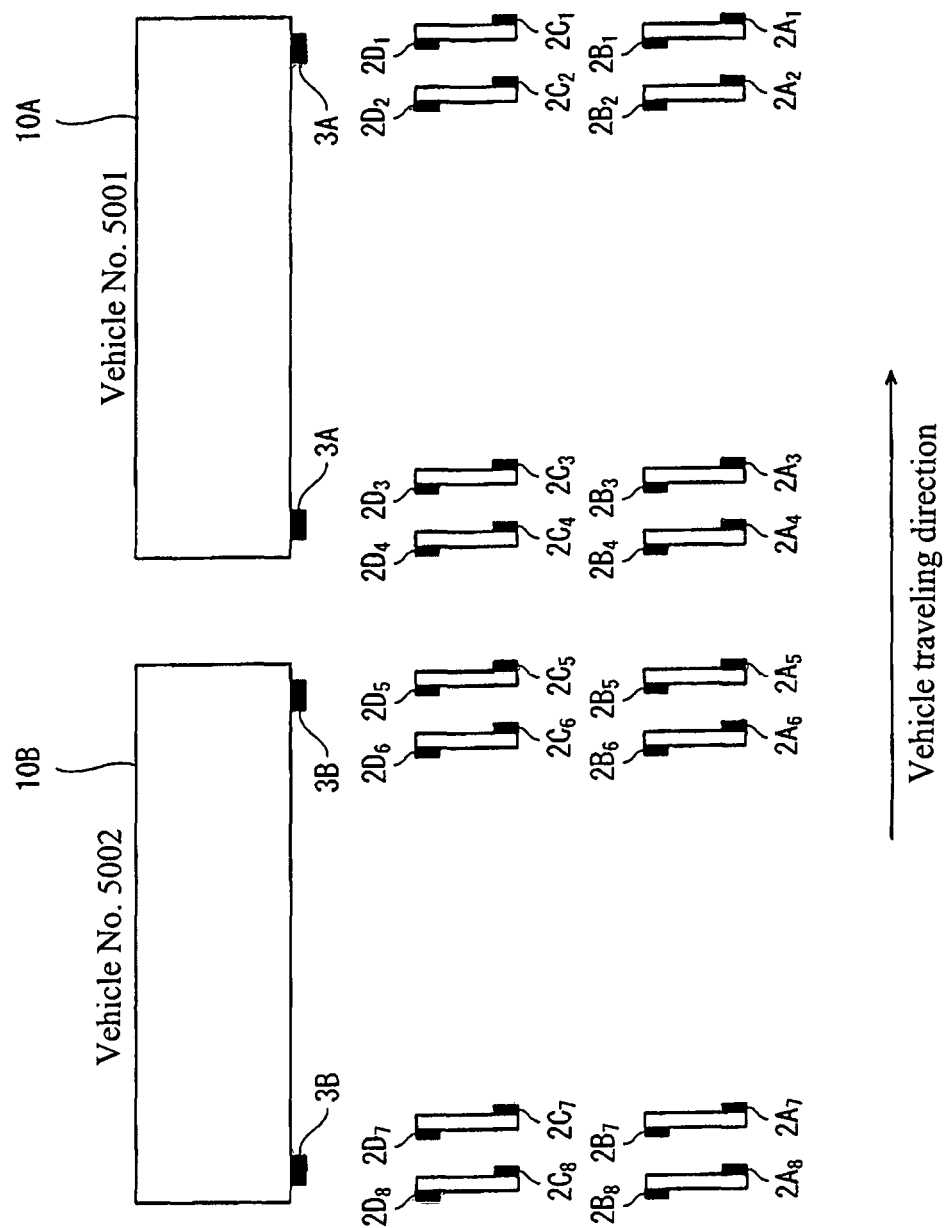
FIG. 6 is an arrangement view of a vehicle body RF tag and brake shoe abrasion detection units of the railway vehicle shown in FIG. 1.
Figure 7:
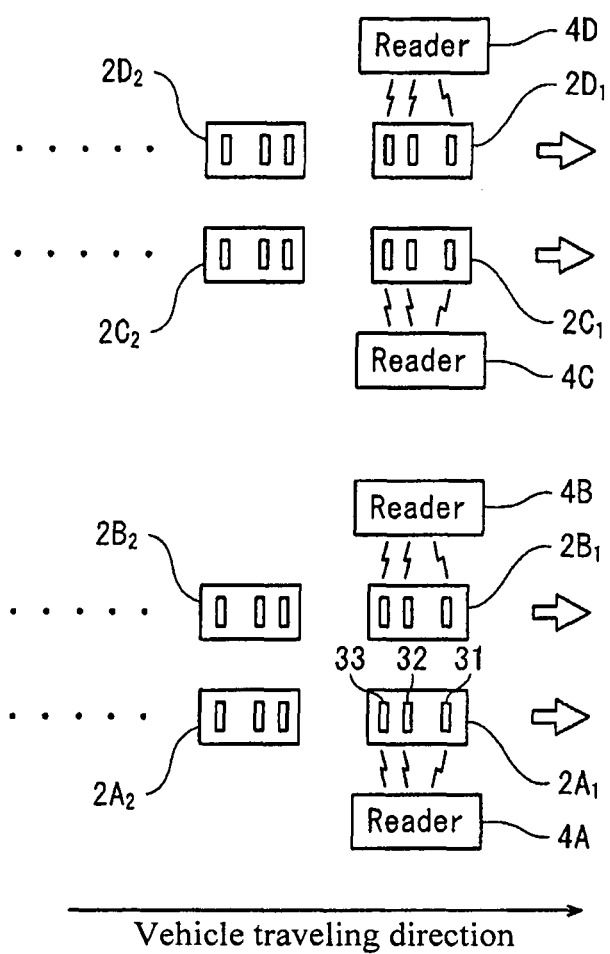
FIG. 7 is a schematic view showing a relationship between the brake shoe abrasion detection units and readers when the railway vehicle shown in FIG. 1 passes the readers.
Figure 8:
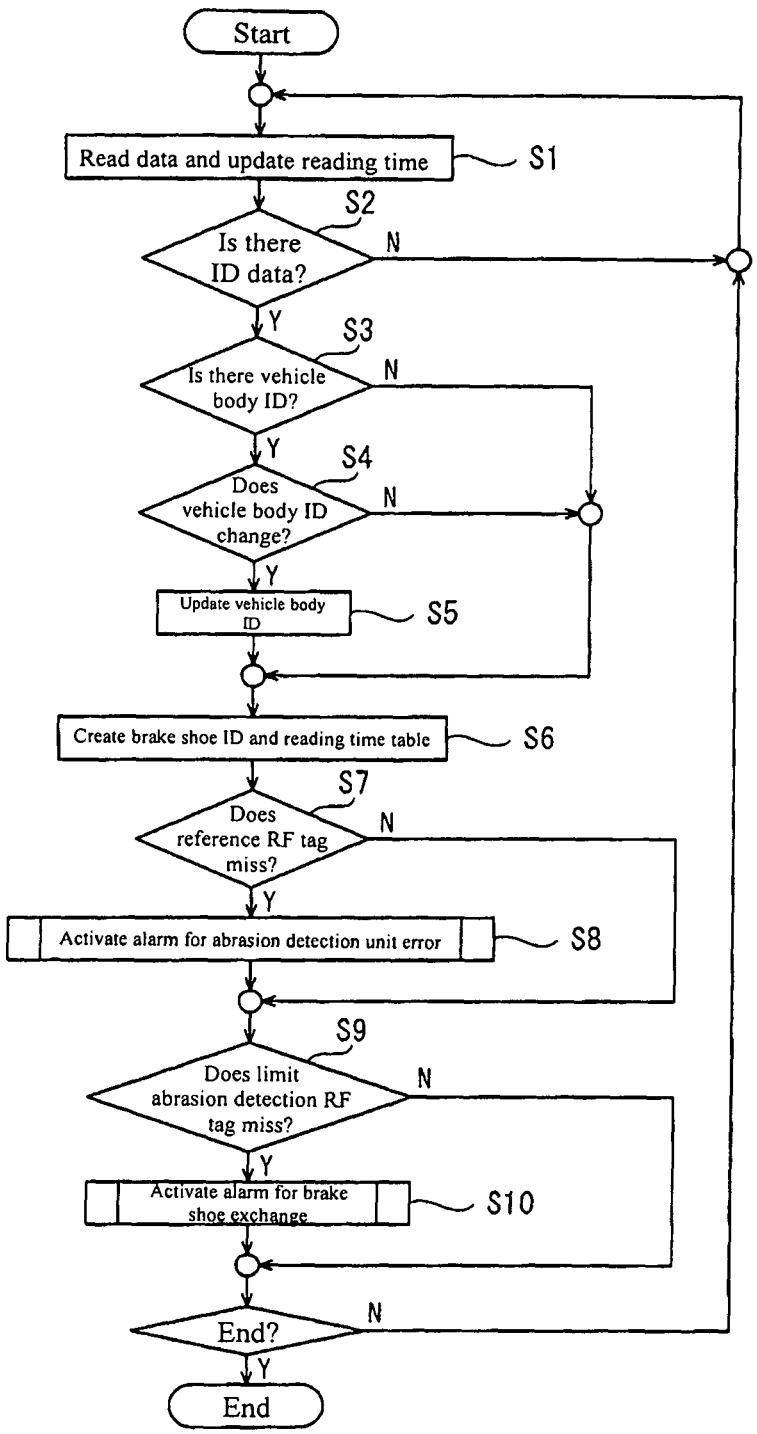
FIG. 8 is a data obtaining flowchart of a data processing device shown in FIG. 1.

FIG. 6 is an arrangement view of the vehicle body RF tag and the brake shoe abrasion detection units 2A to 2D of the railway vehicle shown in FIG. 1. FIG. 7 is a schematic view showing a relationship between the brake shoe abrasion detection units 2A to 2D and the readers 4A to 4D when the railway vehicle 10 shown in FIG. 1 passes the readers 4A to 4D. FIG. 8 is a data obtaining flowchart of the data processing device 5 shown in FIG. 1. FIG. 9 is a diagram showing an example of a reading time table shown in FIG. 8. In this regard, in FIGS. 6 and 7, a number "1" of a subscript assigned to a reference numeral of each of the brake shoe abrasion detection units 2A to 2D means a brake shoe located at a head in a traveling direction of the railway vehicle 10. Larger numbers mean brake shoes located rearward in the traveling direction. Furthermore, in FIG. 6, vehicle body RF tags provided at both end portions (i.e., near a railway bogie) of a first vehicle 10A (ID=5001) in the vehicle longitudinal direction are indicated by 3A. Vehicle body RF tags provided at both end portions (i.e., near the railway bogie) of a second vehicle 10B (ID=5002) in the vehicle longitudinal direction are indicated by 3B.

A data obtaining flow will be described according to a flow of FIG. 8 with reference to FIGS. 6, 7 and 9 as appropriate. When the railway vehicle 10 passes the readers 4A to 4D, each of the readers 4A to 4D sequentially reads respective signals from each of multiple brake shoe abrasion detection units $2A_n$ to $2D_n$ respectively attached to the multiple brake shoes 20 of the railway vehicle 10, at time intervals (step S1). More specifically, first, when the signal (ID) from each of the RF tags 31 to 33 of each of the brake shoe abrasion detection units $2A_n$ to $2D_n$ (n is a natural number) is read (step S2: YES), the reader 4B reads the signal (vehicle body ID) from the vehicle body RF tag 3A (step S3). Furthermore, when the vehicle body ID of the signal changes (step S4: YES), the data processing device 5 stores this vehicle ID and the ID of each of the RF tags 31 to 33 of each of the brake shoe abrasion detection units $2A_n$ to $2D_n$, and creates a reading time table 50 shown in FIG. 9 (step S6). When the vehicle ID of the signal does not change (step S4: NO), the vehicle ID is updated (step S5), and processing proceeds to step S6.

Thus, the data processing device 5 determines an association between each signal and each brake shoe 20 and creates the reading time table 50 based on an order of times at which each of the readers 4A to 4D reads signals from the respective RF tags 31 to 33 of each of a plurality of brake shoe abrasion detection units $2A_n$ to $2D_n$ (n is a natural number) attached to a plurality of brake shoes 20, respectively. That is, the data processing device 5 determines three signals read first by the reader 4A as the signals from the respective RF tags 31 to 33 of a brake shoe abrasion detection unit $2A_1$ of a first wheel axle (first axle) from the head.

Furthermore, the data processing device 5 determines three signals read by the reader 4A some time after the previous determination as the signals from the respective RF tags 31 to 33 of a second brake shoe abrasion detection unit $2A_2$ from the head. Subsequently, the data processing device 5 determines what order of a signal from the brake shoe abrasion detection unit $2A_n$ from the head a received signal is. By so doing, it is not necessary to learn in advance the association between each of the RF tags 31 to 33 of each of the brake shoe abrasion detection units $2A_n$ to $2D_n$ and a location of each brake shoe 20, and it is possible to substantially simplify system implementation and management.

Furthermore, the data processing device 5 determines a set number or a vehicle number associated with each signal read by each of the readers 4A to 4D from each of the RF tags 31 to 33 of each of the brake shoe abrasion detection units $2A_n$ to $2D_n$ and creates the reading time table 50, based on signal data read by the reader 4B from the vehicle body RF tags 3A and 3B. By so doing, it is not necessary to learn in advance the association between each of the RF tags 31 to 33 of each of the brake shoe abrasion detection units $2A_n$ to $2D_n$ and a set number or the vehicle number, and it is possible to further simplify system implementation and management.

Furthermore, when the signal from the reference RF tag 33 misses as indicated by an $X_1$ portion in FIG. 9 (step S7: YES), the data processing device 5 determines that this brake shoe abrasion detection unit $2A_4$ has an abnormality (e.g., unintended damage), and actives an alarm for an error (step S8).

Furthermore, when the signal from the limit abrasion detection RF tag 32 of a brake shoe abrasion detection unit $2A_8$ misses as indicated by an $X_2$ portion in FIG. 9 (step S9: YES), the data processing device 5 determines that abrasion of this brake shoe reaches the abrasion limit 24 and activates an alarm for brake shoe exchange (step S10).

FIG. 10 is an abrasion characteristics analyzing flowchart of the server 6 shown in FIG. 1. Hereinafter, abrasion characteristics analysis of the brake shoe 20 performed by the server 6 will be described according to a flow in FIG. 10 with reference to FIGS. 1 and 3 as appropriate. First, the server 6 designates a vehicle body ID, left and right positions and an axle position related to an analysis target brake shoe (step S11). Furthermore, the server 6 extracts obtained data of each of the RF tags 31 to 33 of each of the brake shoe abrasion detection units 2A and 2B of the designated brake shoe 20 from the reading time table 50 (step S12).

Furthermore, the server 6 extracts a time t1 at which a combination of IDs of the respective RF tags 31 to 33 of the brake shoe abrasion detection units 2A and 2B of the designated brake shoe 20 has been detected first (step S13). Next, the server 6 extracts a time t2 at which signals (IDs) of the initial abrasion detection RF tags 31 of the brake shoe abrasion detection units 2A and 2B of this designated brake shoe 20 have missed first (step S14).

Furthermore, the server 6 calculates a time difference $\Delta t1$ ($=t2-t1$) between the time t1 at which the combination of the IDs of the respective RF tags 31 to 33 of the brake shoe abrasion detection units 2A and 2B of the designated brake shoe 20 has been detected first, and the time t2 at which the signals (IDs) from the initial abrasion detection RF tags 31 of the brake shoe abrasion detection units 2A and 2B of this designated brake shoe 20 have missed first after this time t1, and divides a distance (reference abrasion amount L) from the initial braking surface 21a of the brake shoe 20 to a position of the initial abrasion detection RF tag 31 by the time difference $\Delta t1$ to calculate an abrasion velocity V ($=L/\Delta t1$) (step S15).

Furthermore, the server 6 divides by the abrasion velocity V a distance L2 from the position of the initial abrasion detection RF tag 31 to the position of the abrasion limit 24 to calculate a remaining operational time $T_{rem}$ ($=L2/V$) taken by abrasion of the brake shoe 20 to reach the abrasion limit 24 (step S15). Consequently, the server 6 can create an operation plan of brake shoe exchange in advance before the abrasion of the brake shoe 20 reaches the abrasion limit 24, and transmit the operation plan to a maintenance manager of the brake shoe, so that maintenance operation efficiency improves.

Furthermore, the brake shoe abrasion detection unit 2A is attached to the outer surface 20a facing the outside of the brake shoe 20 in the vehicle width direction. The brake shoe abrasion detection unit 2B is attached to the inner surface 20b facing the inside of the brake shoe 20 in the vehicle width direction. Furthermore, the brake shoe abrasion detection unit 2A is attached at a position on one side in a circumferential direction (lower side) of the brake shoe 20. The brake shoe abrasion detection unit 2B is attached at a position on the other side in the circumferential direction (upper side) of the brake shoe 20.

The server 6 calculates an uneven abrasion amount $\Delta h1$ ($=V\cdot\Delta t2$) of the brake shoe 20 in the vehicle width direction and the circumferential direction and calculates an uneven abrasion velocity $\Delta V1$ ($=\Delta h1/L$), based on a time difference $\Delta t2$ ($=t3-t2$) between the time t2 which is an earlier one of respective times at which respective signals read by the readers 4A and 4B from the respective initial abrasion detection RF tags 31 of the brake shoe abrasion detection units 2A and 2B have missed first, and a time t3 which is later one of respective times at which the respective signals read by the readers 4A and 4B from the respective initial abrasion detection RF tags 31 of the brake shoe abrasion detection units 2A and 2B have missed first (step S16).

By attaching the brake shoe abrasion detection unit 2A and the brake shoe abrasion detection unit 2B at the above positions, it is possible to suppress an increase in the number of the brake shoe abrasion detection units 2A and 2B per brake shoe 20, and learn tendency of uneven abrasion of the brake shoe 20 in the vehicle width direction and the circumferential direction. Furthermore, when abrasion of the brake shoe 20 reaches the abrasion limit, in a similar manner to the above, the uneven abrasion amount and the uneven abrasion velocity of the brake shoe 20 can be calculated from a destruction period of the limit abrasion detection RF tag 32 of the brake shoe abrasion detection unit 2A and a destruction period of the limit abrasion detection RF tag 32 of the brake shoe abrasion detection unit 2B. In addition, a brake shoe abrasion detection unit which is provided at a position on an opposite side in the circumferential direction on the same plane with respect to the brake shoe abrasion detection unit 2A, and a brake shoe abrasion detection unit which is provided at the same position in the circumferential direction on an opposite plane in the vehicle width direction with respect to the brake shoe abrasion detection unit 2A may be used to separately detect uneven abrasion in the vehicle width direction and uneven abrasion in the circumferential direction.

Furthermore, the server 6 calculates a time difference $\Delta t3$ between the time t1 at which the readers 4A and 4B have first read the signals from the initial abrasion detection RF tags 31 of the brake shoe abrasion detection units 2A and 2B, and a time t4 at which signals read by the readers 4A and 4B from one of the limit abrasion detection RF tags 32 of the brake shoe abrasion detection units 2A and 2B have missed first, and stores this time difference $\Delta t3$ as a total operational time $T_{total}$ of the brake shoe 20 in the database 7 (step S17).

Furthermore, the server 6 stores each data received from the readers 4A to 4D, and the above past information of calculation results based on each data in the database 7. Furthermore, when calculating the above remaining operational time $T_{rem}$, the server 6 corrects the remaining operational time $T_{rem}$ based on the past information stored in the database 7. According to one example, when tendency is learned, from the past information, that abrasion progress is faster than that in a normal case due to characteristics of a vehicle type, the remaining operational time $T_{rem}$ is corrected to be shortened. According to another example, when tendency is learned, from the past information, that abrasion progress is slower in winter than in summer, the remaining operational time $T_{rem}$ is corrected to be longer in winter than in summer. By performing correction using a past record which reflects individual factors in this way, it is possible to precisely estimate an operational life.

Furthermore, when a signal read by the reader 4A from the initial abrasion detection RF tag 31 (or the limit abrasion detection RF tag 32) of the one brake shoe abrasion detection unit 2A misses, and then a signal is normally read from the same initial abrasion detection RF tag 31 (or the limit abrasion detection RF tag 32), the server 6 determines that a reading miss of the signal from this initial abrasion detection RF tag 31 (or the limit abrasion detection RF tag 32) is an error. Consequently, when the miss of the signal from the initial abrasion detection RF tag 31 (or the limit abrasion detection RF tag 32) is due to a temporary factor (e.g., rain), the server 6 can correct information about the miss of the signal, and learn that the initial abrasion detection RF tag 31 (or the limit abrasion detection RF tag 32) is not yet destroyed.

In addition, according to the above embodiment, the data processing device 5 creates the reading time table and the server 6 analyzes abrasion characteristics to disperse the creation of the reading time table and the analysis of the abrasion characteristics to different locations. However, one of the data processing device 5 and the server 6 may create the reading time table and analyze the abrasion characteristics. That is, a computer that creates the reading time table and analyzes abrasion characteristics is sufficient.

(First Modification)

Figure 11:
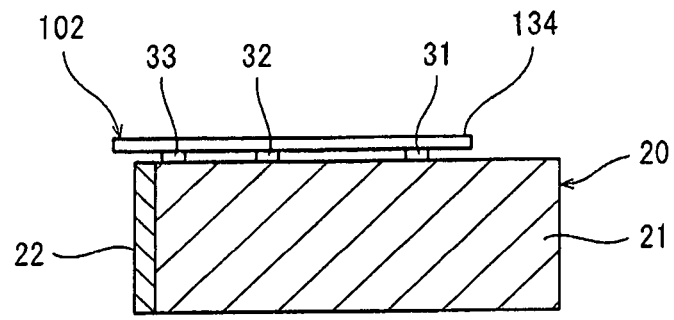
FIG. 11 is a view showing the brake shoe abrasion detection unit according to a first modification and corresponding to FIG. 5.

FIG. 11 is a view showing the brake shoe abrasion detection unit 102 according to a first modification and corresponding to FIG. 5. As shown in FIG. 11, in the brake shoe abrasion detection unit 102, adhesive layers to be applied to the brake shoe 20 are formed on back surfaces of the initial abrasion detection RF tag 31, the limit abrasion detection RF tag 32 and the reference RF tag 33 facing the brake shoe 20. Pressure-sensitive adhesive layers to be detachably applied to top surfaces of the respective RF tags 31 to 33 are formed on a back surface of a base sheet 134. During storage before the brake shoe abrasion detection unit 102 is applied to the brake shoe 20, the adhesive layer of the back surface of each of the RF tags 31 to 33 is protected by a release paper (not shown).

According to this configuration, after the base sheet 134 and the back surface of each of the RF tags 31 to 33 are applied to the brake shoe 20, the base sheet 134 can be peeled and removed from each of the RF tags 31 to 33. Consequently, it is possible to prevent a load produced when abrasion of the brake shoe 20 destroys the first abrasion detection RF tag 31 or the second abrasion detection RF tag 32 from transmitting to the reference RF tag 33 via the base sheet 134.

(Second Modification)

Figure 12:
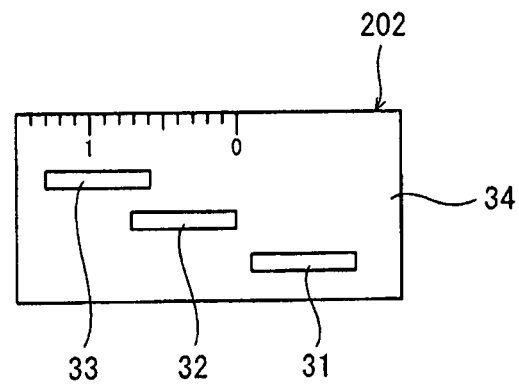
FIG. 12 is a plan view showing the brake shoe abrasion detection unit according to a second modification.

FIG. 12 is a plan view showing a brake shoe abrasion detection unit 202 according to a second modification. As shown in FIG. 12, in the brake shoe abrasion detection unit 202, each of the RF tags 31 to 33 is disposed on the base sheet 34 such that a longitudinal direction of the RF tags 31 to 33 is oriented in a thickness direction of the brake shoe 20. Consequently, it is possible to shift positions of the respective RF tags 31 to 33 in a circumferential direction of the brake shoe 20 from each other, and overlay and dispose the respective RF tags 31 to 33 in the thickness direction of the brake shoe 20. Therefore, the brake shoe abrasion detection unit 202 is easily applied to a brake shoe having a small thickness direction dimension.

(Third Modification)

Figure 13:
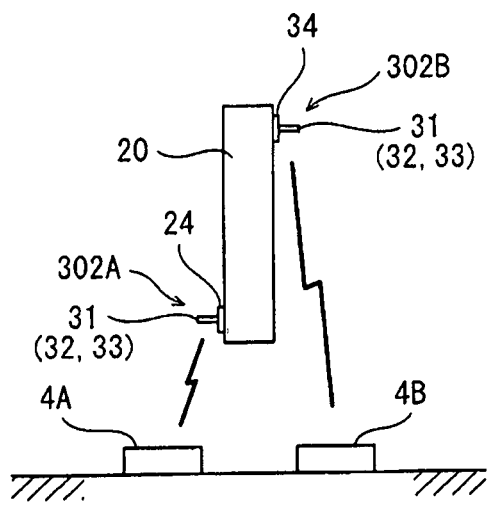
FIG. 13 is a front view showing a state where the brake shoe abrasion detection units according to a third modification are attached to the brake shoe seen from a vehicle longitudinal direction.

FIG. 13 is a front view showing a state where brake shoe abrasion detection units 302A and 302B according to a third modification are attached to the brake shoe 20 seen from a vehicle longitudinal direction. As shown in FIG. 13, in the state where the brake shoe abrasion detection units 302A and 302B are attached to the brake shoe 20, a normal line of a communication surface of each of the RF tags 31 to 33 includes a vertical direction downward component. For example, each of the RF tags 31 to 33 is fixed to form a predetermined angle (e.g., 90°) with respect to the base sheet 34. According to this configuration, when the readers 4A and 4B which read signals from each of the RF tags 31 to 33 are installed at positions lower than the brake shoe 20, it is possible to read signals with good sensitivity.

What is claimed is:

1. A brake shoe abrasion detection unit of a railway vehicle, the brake shoe abrasion detection unit being attached to a brake shoe of a railway vehicle tread brake and detecting abrasion of the brake shoe, the brake shoe abrasion detection unit comprising:
   at least one abrasion detection RF tag that is attached at a position of an abrasion limit of the brake shoe or a position closer to a braking surface than the abrasion limit;
   a reference RF tag that is placed at a position further from the braking surface than the abrasion limit of the brake shoe; and
   a base sheet on which the at least one abrasion detection RF tag and the reference RF tag are provided at different positions in a thickness direction of the brake shoe, and on which an adhesive layer to be applied to the brake shoe is formed,
   wherein the base sheet includes a perforation formed between the at least one abrasion detection RF tag and the reference RF tag, the perforation being formed to be easily fractured compared to other portions of the base sheet.

2. The brake shoe abrasion detection unit of a railway vehicle according to claim 1, wherein
   the at least one abrasion detection RF tag and the reference RF tag are provided on a top surface of the base sheet, and
   the adhesive layer is formed on a back surface of the base sheet.

3. The brake shoe abrasion detection unit of a railway vehicle according to claim 2, wherein the base sheet is a heat resistant sheet.

4. The brake shoe abrasion detection unit of a railway vehicle according to claim 1, wherein
   adhesive layers to be applied to the brake shoe are formed on back surfaces of the at least one abrasion detection RF tag and the reference RF tag, and
   pressure-sensitive adhesive layers to be detachably applied to top surfaces of the abrasion detection RF tag and the reference RF tag are formed on a back surface of the base sheet.

5. The brake shoe abrasion detection unit of a railway vehicle according to claim 1, wherein scale marks aligned in a thickness direction of the brake shoe are applied to the base sheet.

6. The brake shoe abrasion detection unit of a railway vehicle according to claim 1, wherein the at least one abrasion detection RF tag includes a first abrasion detection RF tag that is attached at a position closer to the braking surface than the abrasion limit of the brake shoe, and a second abrasion detection RF tag that is attached at the position of the abrasion limit of the brake shoe.

7. The brake shoe abrasion detection unit of a railway vehicle according to claim 1, wherein
   an identification number of the reference RF tag is a number determined according to a first rule, and
   an identification number of the at least one abrasion detection RF tag is a number determined according to a second rule different from the first rule.

8. The brake shoe abrasion detection unit of a railway vehicle according to claim 1, wherein each of perpendicular lines of communication surfaces of the at least one abrasion detection RF tag and the reference RF tag extends vertically downward or obliquely downward in a state where the abrasion detection RF tag and the reference RF tag are attached to the brake shoe.

9. A brake shoe abrasion detection unit set of a railway vehicle, the brake shoe abrasion detection unit set comprising a plurality of the brake shoe abrasion detection units according to claim 1,
   wherein
   the plurality of the brake shoe abrasion detection units includes a first brake shoe abrasion detection unit and a second brake shoe abrasion detection unit, the first brake shoe abrasion detection unit is attached at a position on a first side seen from a center of the brake shoe, and the second brake shoe abrasion detection unit is attached at a position on a second side seen from the center of the brake shoe.

10. The brake shoe abrasion detection unit set of a railway vehicle according to claim 9, wherein the first brake shoe abrasion detection unit is attached at a position on a first side in a circumferential direction of the brake shoe, and the second brake shoe abrasion detection unit is attached at a position on a second side in the circumferential direction of the brake shoe.

11. The brake shoe abrasion detection unit set of a railway vehicle according to claim 9, wherein the first brake shoe abrasion detection unit is attached to a surface on a first side in a vehicle width direction of the brake shoe, and the second brake shoe abrasion detection unit is attached to a surface on a second side in the vehicle width direction of the brake shoe.

\* \* \* \* \*